(12) United States Patent
Kim et al.

(10) Patent No.: US 12,430,532 B2
(45) Date of Patent: Sep. 30, 2025

(54) PASSIVE RFID TAG

(71) Applicant: SHUYOU (SHANGHAI) TECHNOLOGY CO., LTD., Shanghai (CN)

(72) Inventors: Youngdo Kim, Shanghai (CN); Xiaomeng Ma, Shanghai (CN)

(73) Assignee: SHUYOU (SHANGHAI) TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/727,482

(22) PCT Filed: May 9, 2022

(86) PCT No.: PCT/CN2022/091705
§ 371 (c)(1),
(2) Date: Jul. 9, 2024

(87) PCT Pub. No.: WO2023/097969
PCT Pub. Date: Jun. 8, 2023

(65) Prior Publication Data
US 2025/0094762 A1    Mar. 20, 2025

(51) Int. Cl.
*G06K 19/077* (2006.01)
*H01Q 1/22* (2006.01)

(52) U.S. Cl.
CPC ............................... *G06K 19/07786* (2013.01)

(58) Field of Classification Search
CPC ....... G06K 19/07786; G06K 19/07758; G06K 19/063; G06K 19/07749; G06K 19/07773;
(Continued)

(56) References Cited

U.S. PATENT DOCUMENTS

2011/0241962 A1* 10/2011 Chen ........................ H01Q 5/10
                                                        343/845
2011/0247197 A1* 10/2011 Finn ................. G06K 19/07749
                                                        29/600

FOREIGN PATENT DOCUMENTS

CN          201773418 U      3/2011
CN          206540325 U     10/2017
(Continued)

OTHER PUBLICATIONS

Feasibility Study of Using the Housing Cases of Implantable Devices as Antennas (Year: 2016).*
(Continued)

*Primary Examiner* — Thien T Mai
(74) *Attorney, Agent, or Firm* — HDLS IPR SERVICES; Chun-Ming Shih

(57) ABSTRACT

A passive radio frequency identification (RFID) tag, including: a carrier; metal antennas, respectively disposed in mirror symmetry on a first surface and a second surface of the carrier opposite to each other, wherein a part of the metal antenna on the first surface and another part of the metal antenna on the second surface are open-circuited at one end of the carrier and short-circuited at another end of the carrier; and a RF chip, embedded in the metal antenna for transmitting and receiving a radio signal in a UHF frequency band through the metal antenna, wherein the RF chip is bonded to a PCB module. The solution of the disclosure overcomes phenomenon of deterioration and peeling of a conductive medium forming a radio frequency radiation structure, and significantly improves reliability of the passive RFID tag used in exposure to a high temperature environment for a long time.

9 Claims, 7 Drawing Sheets

(58) Field of Classification Search
CPC ............... G06K 19/041; G06K 19/077; G06K 7/10297; G06K 19/0772; G06K 19/07732; G06K 7/006; G06K 19/07783; G06K 19/07728; H01Q 13/10; H01Q 13/18; H01Q 13/106; H01Q 13/085; H01Q 21/0043; H01Q 19/13; H01Q 1/244; H01Q 1/42; H01Q 1/22
See application file for complete search history.

(56) References Cited

FOREIGN PATENT DOCUMENTS

| CN | 111523631 A | * | 8/2020 | ....... G06K 19/07705 |
|----|----|----|----|----|
| CN | 307019097 S | | 12/2021 | |
| WO | WO-2017078183 A1 | * | 5/2017 | ........... H01Q 1/3266 |

OTHER PUBLICATIONS

A Miniature RFID Tag Antenna Mounted on Metallic Objects (Year: 2016).*
Search Report dated Dec. 14, 2022 of the parent PCT patent application No. PCT/CN2022/091705.

* cited by examiner

PASSIVE RFID TAG

CROSS-REFERENCE TO RELATED APPLICATION

This application is the National Phase of PCT International Application No. PCT/CN2022/091705 filed on May 9, 2022. The entire disclosures of the above application are all incorporated herein by reference.

BACKGROUND OF THE DISCLOSURE

Technical Field

The disclosure relates to a technical field of RFID tags, and is particularly to a passive RFID tag.

Description of Related Art

A passive UHF frequency radio frequency identification (RFID) technology in the band attaches an electronic tag to objects and assets, and identifies information about each object and asset in a contactless manner. This technology processes collected information based on an application environment and transmits the collected information through a wireless radio frequency (RF) with enhanced security and protocols. RFID technology overcomes the shortcomings of existing barcode and QR code technologies such as difficulty in identifying multiple tags in batches, easy surface damage and deterioration, remote identification problems, insufficient storage space, etc., Computerization and intelligence of the custody, maintenance and management of assets and goods, applicable to various industrial sectors.

In recent years, these RFID application fields have gradually expanded to include multiple industries, such as distribution, sales and inventory management in merchandise industry, supply chain management (SCM) of production and logistics in an automotive industry, production history management in shipbuilding and heavy equipment industries, and management of various external facilities in transportation and construction industries, etc. In addition, this trend is expanding application fields in forms of inter-industry integration and evolution of regional and spatial connections. Especially, as the scope of RFID applications expands to various industrial fields and develops through integration among different industries, the demand for reliability of passive RFID tags in extreme ultra-high temperature environments is increasing.

Generally, a passive UHF RFID tags show different degradation characteristics depending on material properties of an attached object, an attachment position, and the application environment. Different degradation characteristics affect not only the electrical performance of the tag, but also the physical durability of the tag. Especially when the passive RFID tags are exposed to high temperatures or seasonal alternations of high and low temperatures and are used repeatedly for a long time, performance damage to raw materials of the tags or fatal damage to electrical bonding of IC chips is easily caused.

Usually, the substrates of RFID tags for UHF frequency band are mostly made of PET (polyethylene terephthalate)/PI materials, PCB FR4 substrates, dielectric ceramics, etc. However, PET material has poor high temperature resistance in long-time high temperature environments. Although PI material having high temperature resistance properties, it is also difficult to maintain inherent properties of a material and the stable properties of the carrier during a high temperature plastic injection molding process, The high temperature resistance of the PCB FR4 substrate makes the it difficult to ensure the reliability of dielectric material in the high temperature environment likes 100° C. or even higher, it will occur the peeling and distortion of layers, and phenomenon of a copper foil being detached and peeling off as a conductive medium on the PCB substrate leads to the loss of electrical tag function, The ceramic dielectrics are manufactured through an ultra-high temperature sintering process above 800° C.

The silver paste, which is a conductive radiating element, is applied to the 3-D ceramic surface by means of a surface printing process and is manufactured by means of a relatively short, high-temperature sintering process. The silver paste produced by this manufacturing process may cause peeling in repeated high temperature application environments. As a conductive medium, the silver paste will shrink during the printing process of vertical/horizontal angular surfaces, which makes the silver paste difficult to ensure the stability of electrical connections at corners.

Therefore, there is an urgent need to provide a passive RFID tag that can be used in the high temperature environments.

SUMMARY OF THE DISCLOSURE

In view of the above shortcomings of the prior art, the purpose of the disclosure is to provide the passive radio frequency identification (RFID) tag to solve the degradation problem of the passive RFID tag in the related art in the high temperature environments.

To achieve the aforementioned purposes and other related purposes, the disclosure provides a passive RFID tag, includes: a carrier, a metal antenna, respectively disposed in mirror symmetry on a first surface and a second surface of the carrier opposite to each other, wherein a part of the metal antenna on the first surface and another part of the metal antenna on the second surface are open-circuited at one end of the carrier and short-circuited at another end of the carrier, a RF chip, embedded in the metal antenna for transmitting and receiving a radio signal in a UHF frequency band through the metal antenna, wherein the RF chip is bonded to a PCB module.

In one of the embodiments, the metal antenna is an adjustable length antenna and configured for changing an electrical parameter of the passive RFID tag by adjusting the length of the metal antenna, and/or the radio frequency chip is removably embedded in the metal antenna and configured for changing the electrical parameter of the passive RFID tag by adjusting an embedding position of the radio frequency chip in the metal antenna.

In one of the embodiments, the electrical parameter comprises a center frequency and/or an impedance characteristic of the passive RFID tag.

In one of the embodiments, the first surface is an upper surface and the second surface is a lower surface, the open-circuited end of the part of the metal antenna on the upper surface is a first open-circuited end, and the open-circuited end of the other part of the metal antenna on the lower surface is a second open-circuited end, wherein a laying length of the metal antenna between the radio frequency chip and the first open-circuited end is negatively correlated with the center frequency of the passive RFID tag and positively correlated with impedance of the passive RFID tag.

In one of the embodiments, a length of the metal antenna is negatively correlated with the center frequency of the passive RFID tag and positively correlated with the impedance of the passive RFID tag.

In one of the embodiments, the length of the metal antenna depends on the length of a mounting slot laid on the carrier for laying the metal antenna and/or a thickness of the carrier. In one of the embodiments, mounting slots are respectively provided in mirror symmetry on the first surface and the second surface of the carrier opposite to each other.

In one of the embodiments, a first main mounting slot and a plurality of first branch mounting slots with different lengths connected to the first main mounting slot are provided on the first surface of the carrier, and a second main mounting slot and a plurality of second branch mounting slots with different lengths connected to the second main mounting slot are provided on the second surface of the carrier.

In one of the embodiments, the radio frequency chip is horizontally disposed on the first surface or the second surface, or the radio frequency chip is vertically disposed on the short-circuit end of the carrier.

In one of the embodiments, the short-circuited end of the carrier has a gap for accommodating the radio frequency chip being vertically disposed.

In one of the embodiments, the passive RFID tag further comprises: a housing, provided with a storage space for placing the carrier, and a cover plate, covering an opening of the storage space.

In summary, the passive RFID tag disclosed by the present disclosure includes: a carrier, a metal antenna, respectively disposed in mirror symmetry on a first surface and a second surface of the carrier that are opposite to each other, wherein a part of the metal antenna on the first surface and another part of the metal antenna on the second surface are open-circuited at one end of the carrier and short-circuited at another end of the carrier; a radio frequency chip, embedded in the metal antenna for transmitting and receiving a radio signal in a UHF frequency band through the metal antenna, wherein the radio frequency chip is bonded to a PCB module.

The disclosure has following beneficial effects: overcomes the deterioration and peeling phenomenon of the conductive medium constituting the radio frequency radiation structure, and significantly improves reliability of the passive RFID tag used in exposure to the high temperature environments for a long time. In addition, the disclosure maximizes an available area of a tag antenna in a limited space to increase design flexibility of the tag.

DETAILED DESCRIPTION

Figure 1:
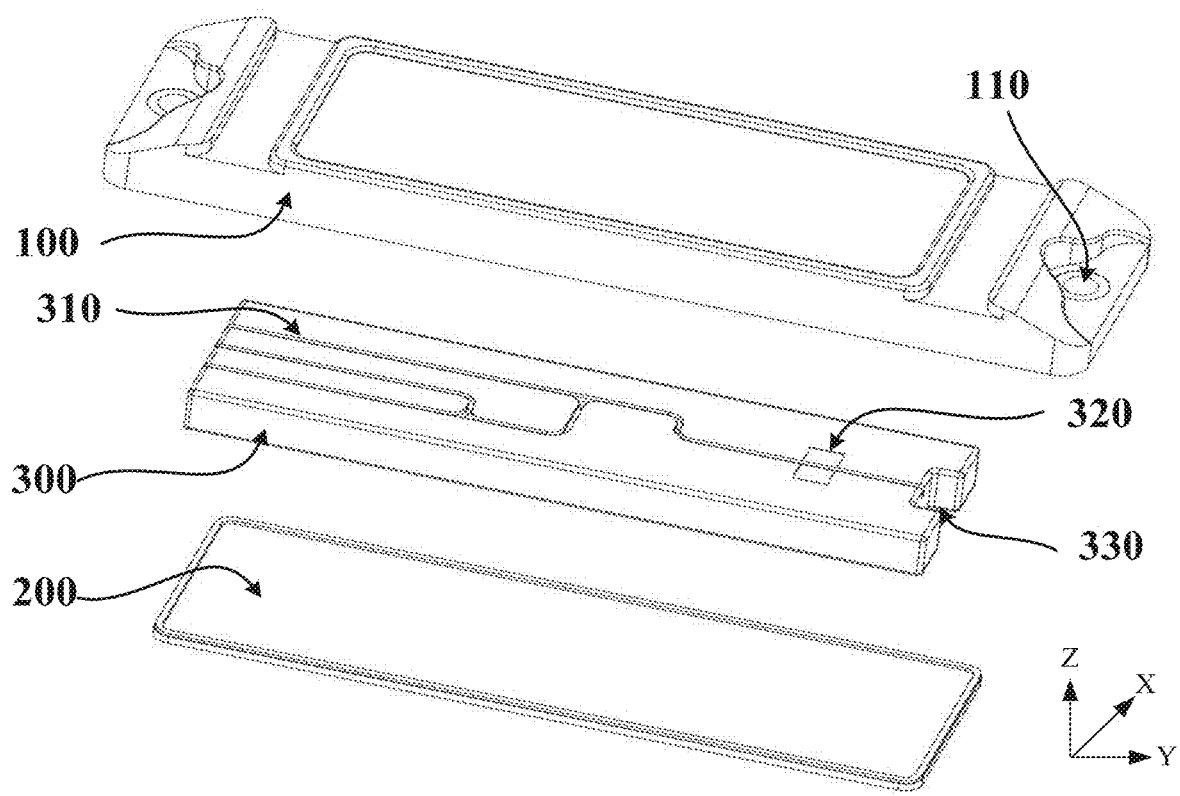
FIG. 1 is a schematic structural diagram illustrating a passive radio frequency identification (RFID) tag according to an embodiment of the disclosure.

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The following describes the implementation of the disclosure through specific examples. Those skilled in the art can easily understand other advantages and effects of the disclosure from the content disclosed in the disclosure. The disclosure can also be implemented or applied through other different specific embodiments, and various details in this specification can also be modified or changed in various ways based on different viewpoints and applications without departing from the spirit of the disclosure. It should be noted that, as long as there is no conflict, the following embodiments and the features in the embodiments can be combined with each other.

It should be noted that the illustrations provided in the following examples only illustrate the basic concept of the present application in a schematic manner. Although the drawings only show the components related to the disclosure and are not drawn according to the number, shape and size of the components in actual implementation, the type, quantity, and proportion of each component in actual implementation can be changed at will, and its component layout type may also be more complex.

As used herein, the singular forms "a", "an" and "the" are intended to include the plural forms as well, unless the context indicates otherwise. It should be further understood that the terms "comprising" and "including" indicate the presence of stated features, steps, operations, elements, components, items, categories, and/or groups, but do not exclude one or more other features, steps, operations, component, component, item, type, and/or the existence, occurrence, or addition of a group. The terms "or" and "and/or" as used herein are to be construed as inclusive or to mean any one or any combination. Therefore, "A, B or C" or "A, B and/or C" means "any of the following: A; B; C; A and B; A and C; B and C; A, B and C". Exceptions to this definition occur only when the combination of elements, functions, steps, or operations is inherently mutually exclusive in some manner.

The electrical characteristic of a passive UHF frequency RFID tag is greatly affected by a material characteristic of an object (or an attached object) to be attached, a position where the passive RFID tag is attached, and a degradation characteristic of the tag with an application environment. This effect plays an important role in overall integrity of a system. Especially when the tag is exposed to an environment with a high temperature or an environment with seasonal alternations of high and low temperatures for a long time, many problems such as degradation of a tag packaging material or reliability of a radio frequency chip bonding may occur.

In order to fundamentally improve the aforementioned problems, the disclosure provides a passive RFID tag. The tag uses a metal antenna as a conductive radiation element of the tag, which improves the degradation characteristic of the tag antenna in a high temperature environment, overcomes deterioration and peeling phenomenon of a conductive medium, and improves the reliability of the passive RFID tag used in many fields that are exposed to the environment with the high temperature or the environment with the seasonal alternations of the high and low temperatures for a long time. In addition, an available area of the tag antenna is maximized in a limited space, thereby improving design flexibility of a tag.

As shown in FIG. 1, it is a schematic structural diagram illustrating the passive radio frequency identification (RFID) tag according to an embodiment of the disclosure. As shown in the figure, overall, the passive RFID tag includes a housing 100, a cover plate 200, and a carrier 300.

In one of the exemplary embodiments, the housing 100 has a storing space for the accommodation of the carrier 300. The cover plate 200 is utilized to cover an opening of the storing space.

In one of the exemplary embodiments, the housing 100 and the cover plate 200 are made of reinforced plastic materials and are packaged by using an ultrasonic fusion manner.

In order to protect the RFID tag from direct external impact or exposure to a high temperature environment, the disclosure uses the ultrasonic fusion manner to seal the housing 100 and the cover plate 200 made of the reinforced plastic material. A storage space between the housing 100 and the cover plate 200 is used to dispose the carrier 300. This ultrasonic fusion manner solves a certain degree of waterproof or dustproof problems and enable the passive RFID tag of the disclosure to withstand a certain level of impact from an external environment.

In the disclosure, mounting holes 110 for fixing to the attached object are provided on two ends of the housing 100. Metal washers are disposed on the mounting holes 110 to reduce abrasion on the housing 100. For example, the mounting holes 110 of the housing 100 are fastened with metal fasteners such as screws to enhance durability of the passive RFID tag.

In some examples, providing the metal washer in the mounting hole 110 prevents the housing 100 from being damaged due to repeated screw tightening or fixation strength. Usually, the passive RFID tag needs to be closely attached and fixed to the attached object when being used. In many cases, the attached object is made of metal. In an actual application environment, when the screws are used to fix the housing 100, if the fixed parts at both ends of the housing 100 are made of plastic, friction and damage may occur to the housing 100, and the metal washers improve such problems.

In the disclosure, the material of the carrier 300 includes but is not limited to any one of PC, ABS, PPS, PEEK and PP.

The carrier 300 described in this disclosure is preferably made of materials such as PPS or PEEK with high temperature resistance. Packing and manufacturing through the injection molding process can further improve durability and air tightness, and also further expand an application range of the special tag in the UHF frequency band. Compared with an existing tag substrate such as PET (polyethylene terephthalate)/PI, which are commonly used as the substrate, the material of the carrier 300 of the disclosure provides better reliability to the passive RFID tag.

In addition, the disclosure also uses the metal antenna as a radiation medium to improve the degradation characteristic of the passive RFID tag in the high temperature environment.

As shown in FIGS. 2A and 2B, or FIGS. 2C and 2D, the metal antenna 400 is disposed in mirror symmetry on a first surface and a second surface of the carrier 300 that are opposite to each other; that is, the metal antenna 400 is disposed on the carrier 300, a trace path of the metal antenna 400 on the first surface is mirror symmetrical with respect to a trace path of the metal antenna 400 on the second surface, and a part of the metal antenna 400 on the first surface and another part of the metal antenna 400 on the second surface are open-circuited at one end of the carrier 300 and short-circuited at another end of the carrier 300.

Preferably, the metal antenna 400 described in the disclosure includes but is not limited to metal wires such as copper wires, aluminum wires, and iron wires. In some embodiments, a suitable material can be coated on the surface of the metal antenna 400 to improve welding strength and convenience, which prevents the deterioration phenomenon that occurs during thermal fusion in a high temperature working environment and a high temperature process, thereby improving stability of an operating temperature characteristic for the tag and reducing a defective rate of the tag itself when the tag is used repeatedly and for a long time in a high temperature application environment. Therefore, the usage life of the tag can be improved.

In the disclosure, the metal antennas 400 disposed on two surfaces of the carrier 300 opposite to each other introduces capacitance vector components, and the mirror symmetry of the metal antennas 400 makes antenna matching of the passive RFID tag easier to control or perform impedance matching.

The RF chip usually has a complex impedance, i.e. $Z=R+jX$, where Z is the complex impedance, R is a real part of the impedance, X is an imaginary part of the impedance, and the imaginary part of the impedance is mainly caused by capacitance and inductance. When performing the impedance matching, the antenna impedance needs to be adjusted to the conjugate impedance of the chip impedance in order to form conjugate matching. The trace path of the metal antenna 400 on the first surface is mirror symmetrical with respect to the trace path on the second surface, so that the capacitance vector components can be formed, which makes the metal antenna 400 have the complex impedance for the ease of the impedance matching.

In the disclosure, the part of the metal antenna 400 on the first surface and the other part of the metal antenna 400 on the second surface are open-circuited at the one end of the carrier 300 and short-circuited at the other end of the carrier 300. That is, in the disclosure, the metal antenna 400 forms an electrical open-circuited structure on one side of the carrier 300 and a short-circuit structure on another side of the carrier 300, so that the metal antenna 400 forms a three-dimensional structure as a radiation medium. Next, by adjusting a length of the metal antenna 400, impedance of various commercial radio frequency chips is freely matched.

Usually, current radiation mediums or materials are limited by lack of flexibility of their own materials, and most of them only achieves one-dimensional linear tag forms. However, the radiation medium or material metal antenna 400 is used in the disclosure, where the radiation medium or material metal antenna 400 has a certain level of flexibility and can achieve a three-dimensional tag form, such as being disposed on the first surface and second surface of the carrier 300 opposite to each other. Compared with the one-dimensional linear tag form, the metal antenna 400 used in the disclosure is better used for electrical impedance matching of a passive RFID tag antenna.

It should be noted that a traditional tag radiation medium or material design mainly uses a spatial area to improve the impedance matching and radiation gain of the tag. Based on a flexible characteristic of the metal antenna 400, the disclosure expands or extends various structural designs within a limited space area, thereby improving efficiency and the design flexibility of the tag. In addition, because a flexible wire characteristic of the radiation medium or material, the disclosure easily controls a center frequency of the passive RFID tag and optimizes the electrical characteristic by simply changing the length of the metal antenna 400 on the carrier 300.

In some examples, a total length of the metal antenna 400 in the disclosure is affected by a dielectric constant of the carrier 300, a distance between the upper part and the lower part of the metal antenna 400, a relative position of the radio frequency chip 500, and the impedance characteristic of the radio frequency chip 500 being used. Therefore, these design parameters are changed to obtain optimal radiation gain by changing various design parameters based on impedance of the radio frequency chip being used. The advantage of the disclosure is that based on a length and a height of the fixed carrier 300, a position of the radio frequency chip 500 and the length of the metal antenna 400 are easily adjusted to match the radio frequency chip 500 of various impedances.

In one or more embodiments of the disclosure, the metal antenna 400 is an adjustable length antenna, used to change an electrical parameter of the passive RFID tag by adjusting the length of the metal antenna 400. Further, the length of the metal antenna 400 depends on a length of the mounting slot 310 laid on the carrier 300 for laying the metal antenna and/or a thickness of the carrier 300; and/or the radio frequency chip 500 is movably embedded in the metal antenna 400, used to change the electrical parameter of the passive RFID tag by adjusting an embedding position of the radio frequency chip 500 in the metal antenna 400. Preferably, the electrical parameter includes the center frequency and/or the impedance characteristic of the passive RFID tag.

Specifically, under the premise that the metal antenna 400 is used as the radiation medium, the length of the metal antenna 400 is directly or indirectly changed through any one or a combination of the following approaches, thereby changing the center frequency and/or the impedance characteristic (or gain effect) of the passive RFID tag:

1) Change the Lengths of the Parts of the Metal Antenna 400 on the First Surface and the Second Surface.

In the disclosure, the mounting slots 310 are respectively provided on the first surface and the second surface of the carrier 300 opposite to each other; a trace path of the mounting slot 310 on the first surface is mirror symmetrical with respect to a trace path of the mounting slot 310 on the second surface. The mounting slots 310 are used to lay the metal antenna 400; and in order to ensure that the trace path of the metal antenna 400 on the first surface is mirror symmetrical with respect to the trace path on the second surface, the mounting slots 310 are also provided in mirror symmetry on the two surfaces of the carrier 300 that are opposite to each other.

Specifically, the lengths of the parts of the metal antenna 400 on the first surface and the second surface are negatively correlated with the center frequency of the passive RF tag and positively correlated with the impedance of the passive RF tag.

Simply, the shorter the overall length of the metal antenna 400, the higher the center frequency of the passive RFID tag and the lower the impedance characteristic of the passive RFID tag will be; On the contrary, the longer the overall length of the metal antenna 400 is, the lower the center frequency of the passive RF tag and the higher the impedance characteristic of the passive RF tag will be.

In order to facilitate changing the lengths of the parts of the metal antenna 400 on the first surface and the second surface, the carrier 300 is provided with various mounting slots of different lengths for selecting the mounting slot with appropriate impedance when laying the metal antenna 400.

As shown in FIG. 2A to FIG. 2D, it is respectively illustrated as mounting slot structures on two surfaces opposite each other on the carrier 300. As shown in the figures, a first main mounting slot 311 is provided on the first surface of the carrier 300, a second main mounting slot 312 is provided on the second surface of the carrier 300, and the path of the first main mounting slot 311 is mirror symmetrical with respect to the path of the second main mounting slot 312.

In one embodiment of the disclosure, multiple first branch mounting slots 313 with different lengths used for extending a laying length of the metal antenna 400 on the first surface and connected to the first main mounting slot 311 are provided on the first surface of the carrier 300; multiple second branch mounting slots 314 with different lengths used for extending a laying length of the metal antenna 400 on the second surface and connected to the second main mounting slot 312 are provided on the second surface of the carrier 300; correspondingly, each of the first branch mounting slots 313 is mirror symmetrical with respect to each of the second branch mounting slots 314.

Figure 2A:
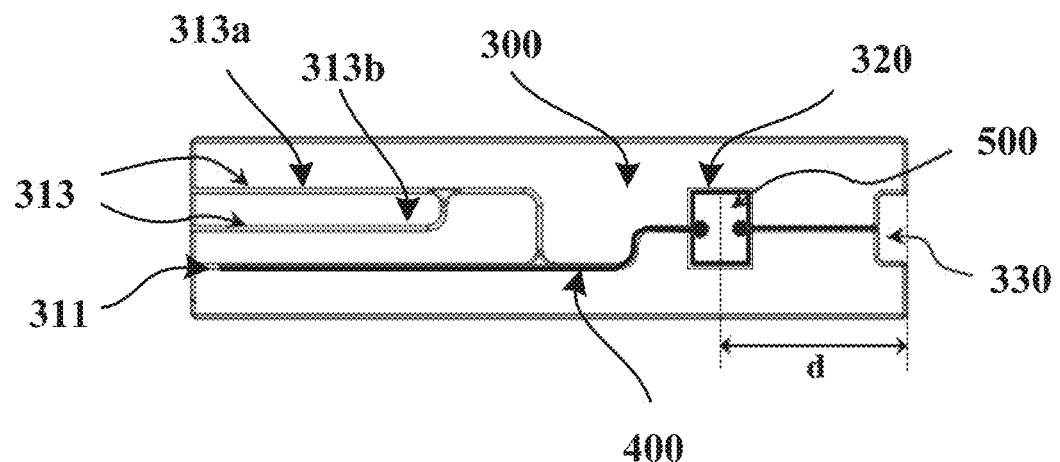
FIG. 2A to FIG. 2D respectively are schematic structural diagrams illustrating metal antennas laid in different mounting slots in an embodiment of the disclosure.
Figure 2B:
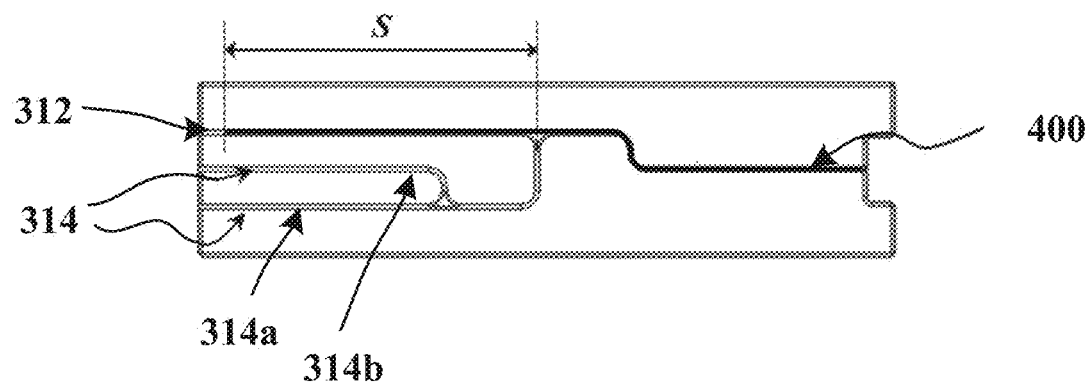

For example, FIG. 2A illustrates a length of a part of the metal antenna 400 laid in the first main mounting slot 311. Correspondingly, FIG. 2B illustrates a length of a part of the metal antenna 400 correspondingly laid in the second main mounting slot 312. At this time, the laying length of the metal antenna 400 is the shortest length.

Because a length of the first branch mounting slot 313a is longer than a length of the first main mounting slot 311, and a length of the second branch mounting slot 314a is longer than a length of the second main mounting slot 312, parts of the metal antenna 400 laid in the first branch mounting slot 313a and the second branch mounting slot 314a have longer laying lengths.

Figure 2C:
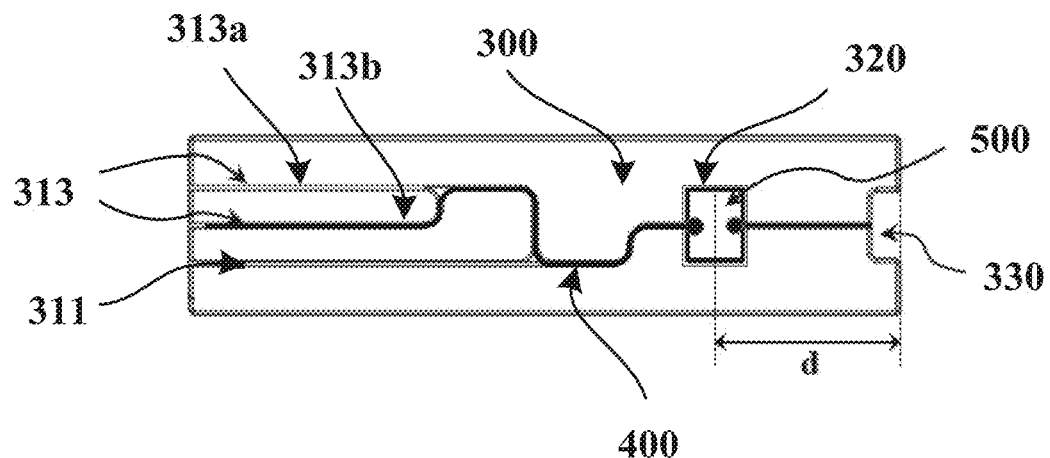
Figure 2D:
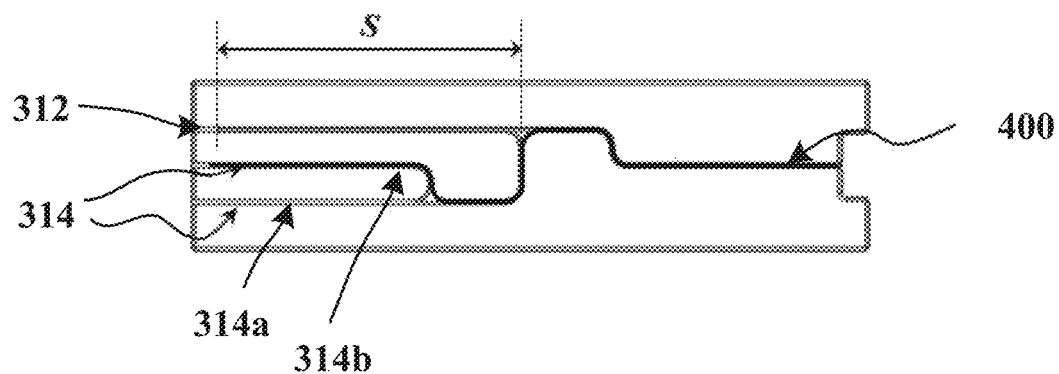

FIG. 2C illustrates a length of a part of the metal antenna 400 laid in the first branch mounting slot 313b. Correspondingly, FIG. 2D illustrates a length of a part of the metal antenna 400 correspondingly laid in the second branch mounting slot 214b. Because a length of the first branch mounting slot 313b is longer than a length of the first branch mounting slot 313a, and a length of the second branch mounting slot 314b is longer than a length of the second branch mounting slot 314a, it is not difficult to see that, the laying length of the metal antenna 400 is the longest length at this time.

Figure 3:
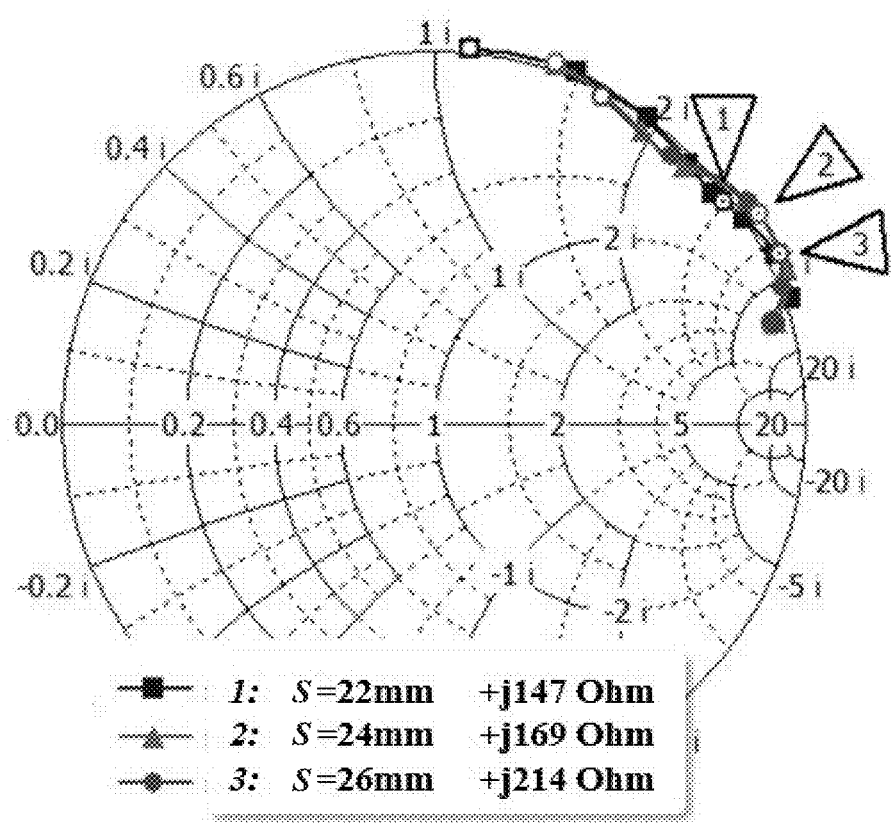
FIG. 3 is a schematic diagram illustrating a relationship between an impedance characteristic of the passive RFID tag and a length S in an embodiment of the disclosure.

As shown in FIG. 3, it is a schematic diagram illustrating a simulation result of impedance of the passive RFID tag changed as the length of the metal antenna 400 on the carrier 300. In order for understanding different length changes of the metal antenna 400, a length S shown in FIG. 2B or FIG. 2D is selected. When the length S of the metal antenna 400 changes from 22 mm to 26 mm, the imaginary part of the complex impedance of the passive RFID tag gradually increases from +j147 Ohm to +j214 Ohm, that is, the imaginary part of the complex impedance of the passive RFID tag increases as the length S of the metal antenna 400 increases.

Therefore, the disclosure independently selects different lengths of branch mounting slot on the same carrier 300 to dispose the metal antenna 400 based on the impedance characteristic of the radio frequency and the dielectric constant of the carrier 300, so as to obtain different lengths of metal antenna 400 or different radiation medium paths, thereby allowing the center frequency and impedance characteristic of the radio frequency to be adjusted. Compared with traditional approaches, the disclosure provides flexible impedance characteristic for the passive RFID tag on the same carrier 300.

Preferably, one end of the first main mounting slot 311 connected to the first branch mounting slot 313 corresponds to the open-circuited end of the carrier 300, and another end of the first main mounting slot 311 is the short-circuited end of the carrier 300. One end of the second main mounting slot 312 connected to the second branch mounting slot 314 corresponds to the open-circuited end of the carrier 300, and another end of the second main mounting slot 312 is the short-circuited end of the carrier 300.

Preferably, depths of the first main mounting slot 311, the second main mounting slot 312, the first branch mounting slot 313, and the second branch mounting slot 314 are the same, so that, after laying the parts of the metal antenna 400 on the first surface and the second surface of the carrier 300 that are opposite to each other, a uniform capacitance is formed between the first surface and the second surface.

Preferably, the path of the first main mounting slot 311 is mirror symmetrical with respect to the path of the second main mounting slot 312, and the path of the first branch mounting slot 313 is mirror symmetrical with respect to the path of the second branch mounting slot 314. Therefore, after laying the parts of the metal antenna 400 on the first surface and the second surface of the carrier 300, the path of the metal antenna 400 on the first surface can be maintained mirror symmetrical with respect to the path of the metal antenna 400 on the second surface.

It should be noted that the mounting slots 310 on the first surface and the second surface of the carrier 300 effectively fix the metal antenna 400 on the carrier 300 and maintain the three-dimensional structure, thereby maintaining a status of effective Impedance matching. During a high-temperature injection molding process, since the mounting slot 310 has a function of fixing the metal antenna 400, performance change caused by subtle movement in a position of the metal antenna 400 is prevented in advance, and the problem of thermal shock to the metal antenna 400 itself during high temperature spraying is fundamentally solved.

Besides, the first branch mounting slot 312 and the second branch mounting slot 314 increase an effective resonance length of the metal antenna 400 in the limited space. Multiple metal antennas 400 with different lengths can be used to control the center frequency of the passive RFID tag or be used selectively based on a dielectric constant error of the carrier 300 to improve the performance of the tag.

Usually, most current tags only have a single slot body. However, when the disposal environment changes and the length of the metal antenna 400 needs to be changed to re-adapt the impedance, a single slot body cannot meet the requirements, thereby causing the passive RFID tag failing or being replaced.

In order to enable the passive RFID tag of the disclosure to be continuously used when the disposal environment changes, based on the first main mounting slot 311 and the second main mounting slot 312, multiple first branch mounting slots 313 with different lengths connected to the first main mounting slot 311 are added especially, and correspondingly, multiple second branch mounting slots 314 with different lengths connected to the second main mounting slot 312 are added.

When the metal antenna 400 is disposed in slot bodies with different lengths, lengths of the metal antenna 400 being laid are also different, thereby based on the impedance characteristic of the radio frequency and the dielectric constant of the carrier 300, selecting different lengths of the metal antenna 400 to be disposed on the same carrier 300 to obtain different lengths of the metal antenna 400 or different radiation medium paths. Thus, the center frequency and the impedance characteristic of the radio frequency are adjusted to freely match the impedance of various commercial radio frequencies. By selecting the length of the metal antenna 400, the center frequency and the impedance characteristic are changed based on different product characteristics during a manufacturing stage, or the center frequency and the impedance matching are easily achieved without changing the appearance of the carrier 300 and the current tags.

In addition, error control is performed in a simple way during the manufacturing stage to provide countermeasures for various errors in a manufacturing process, thereby improving the manufacturing efficiency and the design flexibility to cope with various commercial ICs. In the disclosure, a major part of the mounting slot 310 described in the disclosure maintains a straight structure, and only a small part of the mounting slot 310 has a curved structure. That is, a major part of the metal antenna 400 being laid has a straight shape. Different from the bending or winding posture of current metal wires, the metal antenna 400 in the disclosure is basically laid in a straight shape with a purpose of reducing a radar scattering cross section of the passive RFID tag.

It should be noted that due to property of the metal material attached to the passive RFID tag affected by factors, such as radio wave reflection from irregular cross-sections, radio wave energy absorption, and radio wave interference and diffraction due to the surrounding environment, etc., the received signal strength of passive RF tags may decrease. As a result, the performance of the passive RF tag is degraded and an identification rate is significantly reduced. Therefore, the disclosure uses the metal antenna 400 as the conductive material, and a major part of the structure of the metal antenna 400 adopts a linear shape, which reduces a radar scattering cross area of a radar cross section (RCS) of the tag and reduces adverse effects caused by radio wave reflection and interference in the surrounding environment.

2) Change the Embedding Position of the Radio Frequency Chip 500 in the Metal Antenna 400.

In the disclosure, the radio frequency chip 500 is embedded in the metal antenna 400. Preferably, the radio frequency chip 500 is bonded to a front side of a PCB module (or a PCB board) through wire bonding, and is molded with high temperature epoxy resin; Both sides of the back of the PCB module are electrically connected to the metal antenna 400, and the PCB module achieves electrical connection between the front and the back through via holes.

In one or more embodiments, the disclosure also bonds radio frequency chips 500 with various impedances to the PCB module, and the PCB module uses wire bonding and plastic packaging processes to make various RF chips into modules and dispose them on the carrier 300, thereby distinguishing the electrical characteristic of the RF chip from radiation effect of the tag to improve durability and the design flexibility of the tag.

In some examples, a chip slot 320 for placing the radio frequency chip 500 is also embedded in a slot path of the first main mounting slot 311 on the first surface of the carrier 300 or the second main mounting slot 312 on the second surface of the carrier 300. Preferably, the front of the PCB module is disposed at the bottom of the chip slot 320, thereby fixing the radio frequency chip 500 between the carrier 300 and the PCB module to protect the radio frequency chip 500 from physical impact. The chip slot 320 is mechanically made with a certain slot on the front to increase convenience and fixing tension during a radio frequency welding process.

In an embodiment of the disclosure, the first surface is an upper surface, the second surface is a lower surface, the open-circuited end of the metal antenna 400 on the upper surface is a first open-circuited end, and the open-circuited end of the metal antenna 400 on the lower surface is a second open-circuited end; wherein the laying length of the metal antenna 400 between the radio frequency chip 500 and the first open-circuited end is negatively correlated with the center frequency of the passive RFID tag and positively correlated with the impedance of the passive RFID tag; or the laying length of the metal antenna 400 between the radio frequency chip 500 and the second open-circuited end is positively correlated with the center frequency of the passive RFID tag and negatively correlated with the impedance of the passive RFID tag.

Preferably, the radio frequency chip 500 is horizontally disposed on the first surface or the second surface; or the radio frequency chip 500 is vertically disposed on the short-circuit end of the carrier 300. The short-circuited end of the carrier 300 has a gap 330 for accommodating the radio frequency chip 500 being vertically disposed.

In the disclosure, position selection of the radio frequency chip 500 on the carrier 300 is one of most important design variables that decides the impedance matching of the passive RFID tag. When the radio frequency is disposed on the upper surface or lower surface of the carrier 300 or is disposed in the gap 330 of the carrier 300, the impedance matching of the passive RFID tag varies greatly, thereby allowing flexibility in the selection of various chips. The gap 330 is provided at one end of the carrier 300 to ensure space for placing the radio frequency chip 500, thereby improving scalability of the passive RFID tag.

Specifically, when the radio frequency chip 500 is disposed in the gap 330 at one end of the carrier 300, tag performance in a metal-attached state is maximized. If metal and non-metal are used together, the radio frequency chip 500 may be disposed on the upper surface or the lower surface of the carrier 300 to minimize performance changing caused by changing the medium of the attached object.

Simply, the position selection of the radio frequency chip 500 depends on the impedance characteristic of the radio frequency chip 500 being used and the total length of the metal antenna 400. Specifically, when the radio frequency chip 500 is disposed on the upper surface of the carrier 300, it is suitable for a situation where the chip impedance is smaller; when the radio frequency chip 500 is disposed on the lower surface of the carrier 300, it is suitable for a situation where the chip impedance is relatively larger; when the radio frequency chip 500 is disposed in the gap 330 of the carrier 300, it is suitable for a situation where the chip impedance is medium.

Further, when the radio frequency chip 500 is disposed on the upper surface of the carrier 300, within a certain range, the radio frequency chip 500 being closer to the open-circuited end of the carrier 300 makes the center frequency of the passive RFID tag higher and the impedance of the passive RFID tag lower; on the contrary, the radio frequency chip 500 being farther from the open-circuited end of the carrier 300 makes the center frequency of the passive RFID tag lower and the impedance of the passive RFID tag higher. Correspondingly, when the radio frequency chip 500 is disposed on the lower surface of the carrier 300, within a certain range, the radio frequency chip 500 being closer to the open-circuited end of the carrier 300 makes the center frequency of the passive RFID tag lower and the impedance characteristics of the passive RFID tag higher; on the contrary, the radio frequency chip 500 being farther from the open-circuited end of the carrier 300 makes the center frequency of the passive RFID tag higher and the impedance characteristics of the passive RFID tag lower. Simply, when the radio frequency chip 500 is farther from the open-circuited end of the upper surface, a relative length of the metal antenna 400 will be longer, thereby marking the center frequency of the passive RFID tag lower and the impedance of the passive RFID tag higher, so that the impedance matching will be relatively easier.

Figure 4:
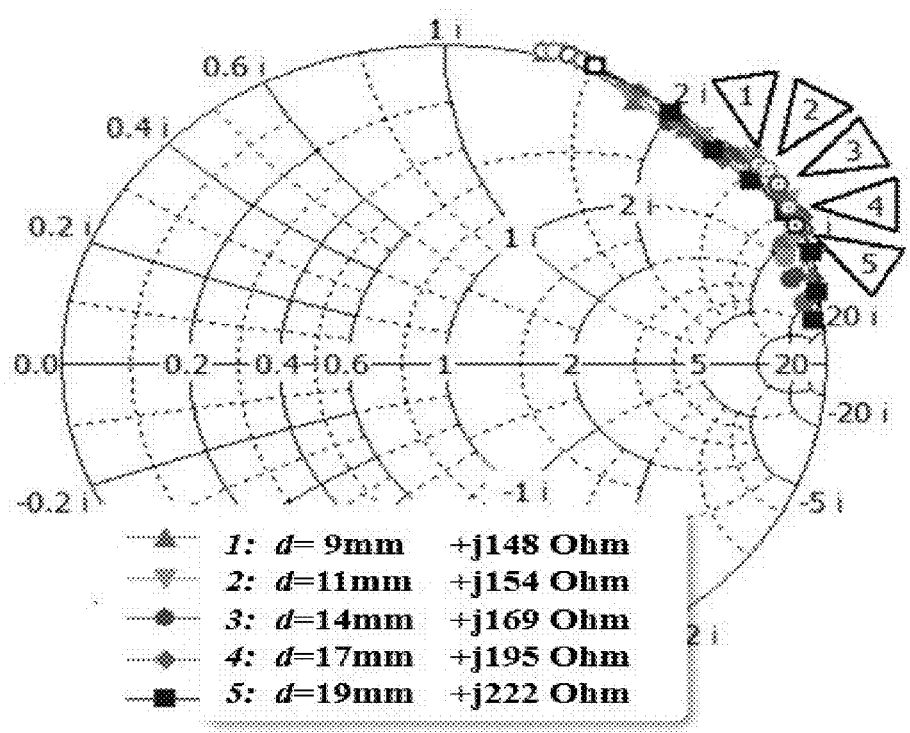
FIG. 4 is a schematic diagram illustrating the relationship between the impedance characteristic of a passive RFID tag and a distance d in an embodiment of the disclosure.

For example, assuming that a distance from the radio frequency chip 500 on the upper surface to the short-circuit end is d, as shown in FIG. 4, which is a schematic diagram illustrating a simulation result of the impedance of the passive RFID tag based on the change of the distance d. As shown in the figure, when the distance d from the short-circuit end of the carrier 300 to the center of the radio frequency chip 500 changes from 9 mm to 19 mm, changing in the imaginary part of the complex impedance of a passive RFID tag is shown in the figure. When the distance d from the short-circuit end of the carrier 300 to the radio frequency chip 500 is 9 mm, the imaginary part of the complex tag impedance is +j148 Ohm. When d increases to 19 mm, the imaginary part of the complex impedance of the tag gradually increases to +j222 Ohm. It can be seen that the imaginary part of the complex impedance increases as the distance from the short-circuit end of the carrier 300 to the radio frequency chip 500 increases. That is, the laying length of the metal antenna 400 between the radio frequency chip 500 and the first open-circuited end is negatively correlated with the center frequency of the passive RFID tag and positively correlated with the impedance of the passive RFID tag; on the contrary, the laying length of the metal antenna 400 between the radio frequency chip 500 and the second open-circuited end is positively related to the center frequency of the passive RFID tag and is negatively related to the impedance of the passive RFID tag. Therefore, in order to better match the impedance of the radio frequency chip 500 in various UHF frequency bands, the impedance characteristic of the radio frequency is changed by changing the embedding position of the radio frequency chip 500 in the metal antenna 400.

In one or more embodiments, compared with changing the lengths of the parts of the metal antenna 400 on the first surface and the second surface, changing the embedding position of the radio frequency chip 500 in the metal antenna 400 is fine-tuning.

3) Change the Thickness of the Carrier 300.

In an embodiment of the disclosure, the thickness of the carrier 300 is negatively correlated with the center frequency of the passive RF tag and positively correlated with the impedance of the passive RF tag.

In the disclosure, electrical coupling of the metal antenna 400 on the first surface and the second surface greatly depends on the thickness of the carrier 300.

Simply, increasing the thickness of the carrier 300 is indirectly equivalent to increasing the overall length of the metal antenna 400 that needs to be laid. Therefore, changing the thickness is a further fine-tuning relative to changing the length of the metal antenna 400 on the first surface and the second surface. Therefore, the thickness of the carrier 300 is as related to the center frequency and/or the impedance characteristic of the passive RFID tag as the length of the metal antenna 400. When the thickness of the carrier 300 increases, the center frequency of the passive RFID tag decreases and the impedance of the passive RF tag increases; on the contrary, when the thickness of the carrier 300 decreases, the center frequency of the passive RF tag increases and the impedance of the passive RF tag decreases.

However, because the increase in the thickness of the carrier 300 is accompanied by an increase in an overall size of the passive RFID tag and is affected by the material parameter of the carrier 300, the thickness of the carrier 300 being larger is not always better and the thickness of the carrier 300 is appropriately adjusted during an actual design.

Overall, one or more of the above approaches of changing the center frequency and/or the impedance characteristic of the passive RFID tag flexibly match the chip impedance of various UHF frequency bands by optimizing a single design parameter or multiple design parameters, and easily change electrical matching without changing the appearance of the current tags.

In the disclosure, one or more cavities are provided on both sides of the carrier 300, such as multiple perforation structures of any size. The design of the cavity reduces a weight of the carrier 300, thereby reducing an amount of material being used in the carrier 300 to achieve a purpose of cost reduction.

Figure 5:
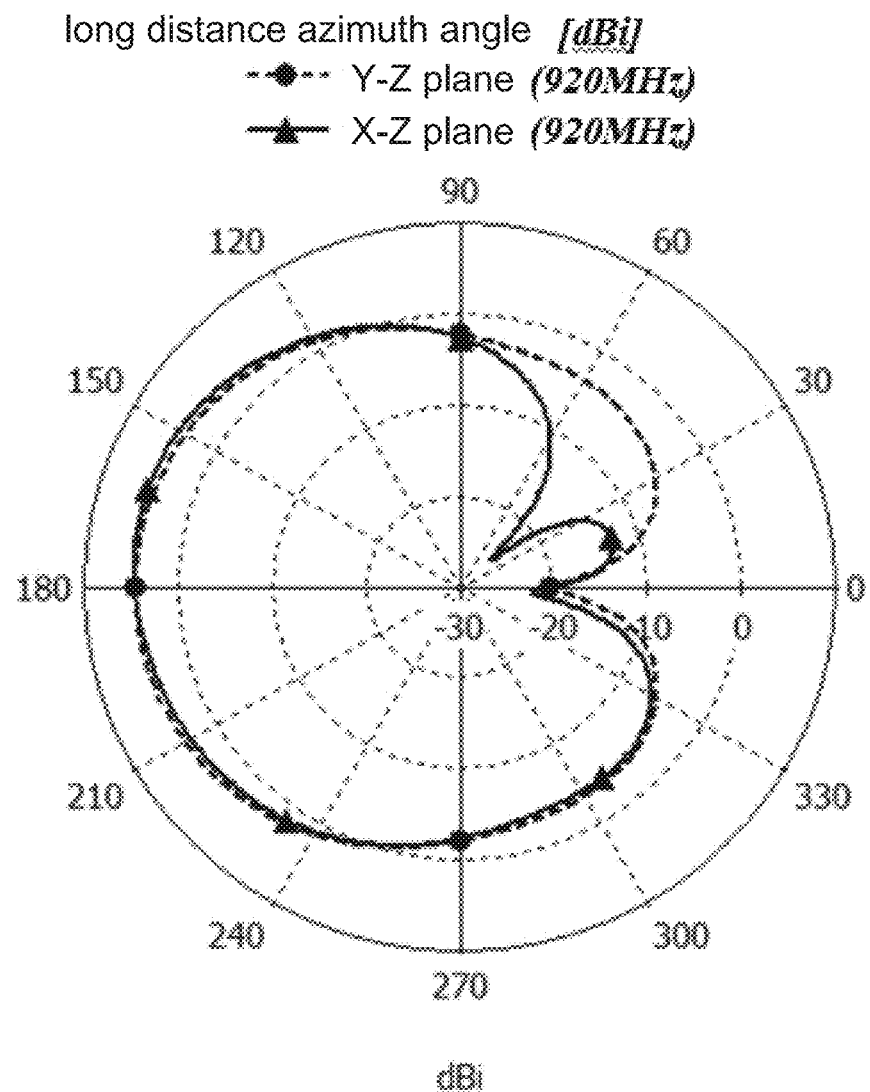
FIG. 5 is a schematic diagram illustrating a radiation result of maximum radiation gain of the passive RFID tag according to azimuth angles in an embodiment of the disclosure.

As shown in FIG. 5, it is a radiation result diagram of maximum radiation gain based on azimuth angles by using the passive RFID tag the metal antenna 400 of the disclosure. That is, radiation patterns on a Y-Z plane and an X-Z plane at a center frequency 920 MHZ of the UHF frequency band, where an XYZ coordinate system is referred to as shown in FIG. 1.

A general application environment of the disclosure is to consider an environment attached to a metal object. For example, if a horizontal length and a vertical length of a ground plane are fixed to 300 mm, the radiation gain based on the ground plane is 4.75 dBi. In terms of structure, a folded radiation medium of the passive RFID tag of the disclosure also shows an asymmetric characteristic in a long-distance radiation pattern (corresponding to solid lines) due to the asymmetric characteristic of left and right of the carrier 300 on the X-Z plane; the radiation pattern on the Y-Z plane (corresponding to dotted lines) shows uniform symmetry on the left and right of the carrier 300. The maximum radiation gain of the passive RFID tag is formed in a vertical direction of the metal ground plane, and the radiation gain of the passive RFID tag partially changes based on the change in size of the ground plane. This is because the role of the ground plane of the tag itself depends on shape of the metal antenna 400 laid on the first surface and the second surface of the carrier 300, rather than the three-dimensional area.

Figure 6:
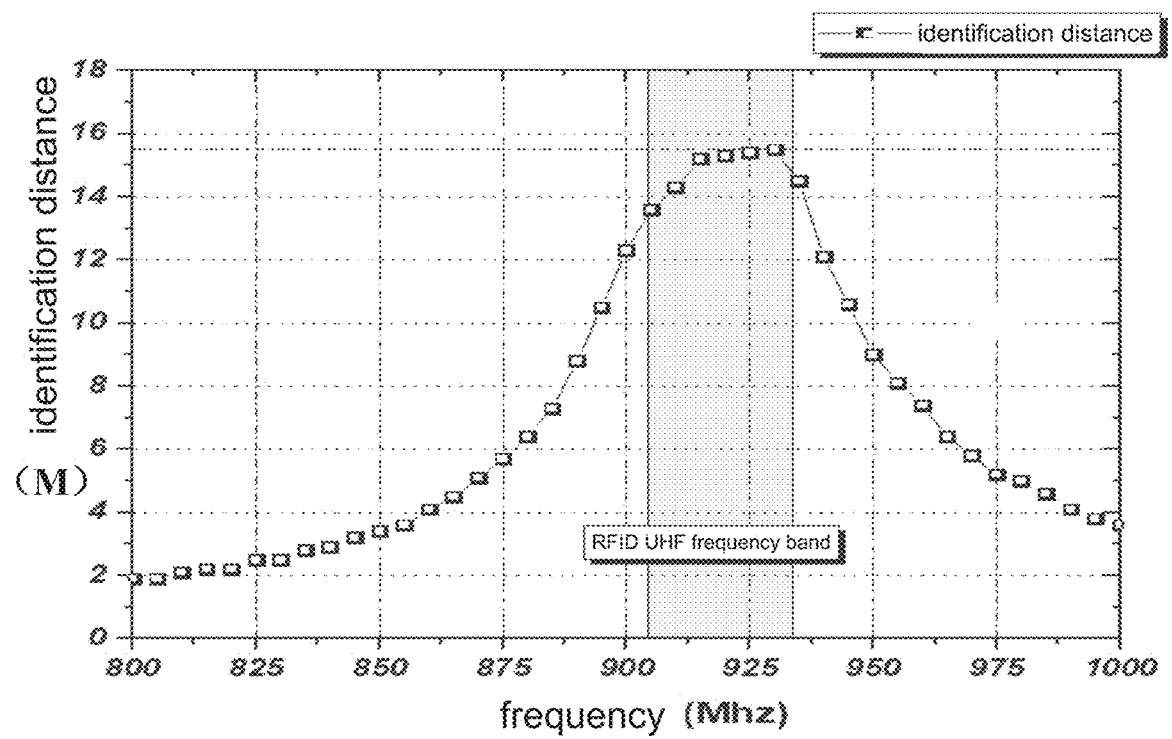
FIG. 6 is a schematic diagram illustrating a measurement result of remote identification distances of the passive RFID tag in an embodiment of the disclosure.

As shown in FIG. 6, it is a measurement result of remote identification distances by using the passive RFID tag of the metal antenna 400 of the disclosure. For example, in a system used for measurements, a passive RFID tag is disposed at a center of a square metal plate measuring 25 cm, and measurement are made in a microwave anechoic chamber by using a Tagformance system of Voyantic Company. A standard power used in a measurement system is measured by setting a sum of a RFID reader power and antenna gain to 36 dBm. When analyzing the identification distance being measured, the identification distance being measured at the center frequency 920 MHz of the UHF frequency band is more than 15 m.

It can be seen from this that the passive RFID tag based on the metal antenna 400 designed in the disclosure not only achieves high temperature resistance, but also has good effects in terms of the identification distance.

In addition, most of PCB materials and ceramic materials for the current UHF frequency band dedicated tags require a special manufacturing equipment and a strictly managed manufacturing technology. However, the metal antenna 400 and carrier 300 disclosed in the disclosure do not require the special manufacturing equipment, and special or complex manufacturing process management is not required, thereby manufacturing using materials that can be purchased on a general market. This convenience in raw material purchasing and manufacturing reduce manufacturing costs to ensure product competitiveness. At the same time, production and management can be implemented depending on an internal factory without relying on an external professional equipment.

In summary, the passive RFID tag disclosed in the disclosure overcomes the degradation and peeling phenomenon of the conductive medium constituting the radio frequency radiation structure, and significantly improves the reliability of the passive RFID tag used in exposure to the high temperature environment for a long time; In addition, the available area of the tag antenna is maximized in the limited space, thereby improving the design flexibility of the tag.

The disclosure effectively overcomes various shortcomings in the prior art and has high industrial utilization value.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A passive radio frequency identification (RFID) tag applying three-dimensional antenna architecture, comprising:
    a carrier, comprising a first surface and a second surface opposite each other, and forming, in a mirror symmetric manner, mounting slots on the first surface and the second surface, wherein a first main mounting slot and a first branch mounting slot with different lengths are formed on the first surface, a second main mounting slot and a second branch mounting slot with different lengths are formed on the second surface;
    a metal antenna, disposed in the first main mounting slot and the second main mounting slot or disposed in the first branch mounting slot and the second branch mounting slot, wherein a first trace path of the metal antenna on the first surface is mirror symmetrical with respect to a second trace path of the metal antenna on the second surface, a part of the metal antenna on the first surface and another part of the metal antenna on the second surface are open-circuited at one end of the carrier and short-circuited at another end of the carrier;
    an RF chip, electrically connected to terminal ends of the metal antenna and mounted on the carrier for transmitting and receiving a radio signal in a UHF frequency band through the metal antenna, wherein the RF chip is bonded to a PCB module.

2. The passive RFID tag in claim 1, wherein the metal antenna is an adjustable length antenna, and the metal antenna is configured for changing an electrical parameter of the passive RFID tag by adjusting a length of the metal antenna; and/or the RF chip is removably inlayed in the metal antenna, and the RF chip is configured for changing the electrical parameter of the passive RFID tag by adjusting an inlaying position of the RF chip in the metal antenna.

3. The passive RFID tag in claim 2, wherein the electrical parameter comprises a center frequency and/or an impedance characteristic of the passive RFID tag.

4. The passive RFID tag in claim 3, wherein the first surface is an upper surface and the second surface is a lower surface, an open-circuited end of the part of the metal antenna on the upper surface is a first open-circuited end, and an open-circuited end of the other part of the metal antenna on the lower surface is a second open-circuited end;

wherein a laying length of the metal antenna between the RF chip and the first open-circuited end is negatively correlated with the center frequency of the passive RFID tag and positively correlated with impedance of the passive RFID tag.

5. The passive RFID tag in claim 3, wherein a length of the metal antenna is negatively correlated with the center frequency of the passive RFID tag and positively correlated with the impedance of the passive RFID tag.

6. The passive RFID tag in claim 2, wherein the length of the metal antenna depends on a length of a mounting slot laid on the carrier for laying the metal antenna and/or a thickness of the carrier.

7. The passive RFID tag in claim 1, wherein the RF chip is horizontally disposed on the first surface or the second surface; or the RF chip is vertically disposed on a short-circuited end of the carrier.

8. The passive RFID tag in claim 7, wherein the short-circuited end of the carrier has a gap for accommodating the RF chip being vertically disposed.

9. The passive RFID tag in claim 1, wherein the passive RFID tag further comprises:

a housing, provided with a storage space for placing the carrier, and a cover plate, covering an opening of the storage space.

* * * * *